J. LEAVY.
GARMENT RECEPTACLE.
APPLICATION FILED MAR. 19, 1909.

920,352.

Patented May 4, 1909.

WITNESSES:
H. Crocheron
Ida G. Gilmore

INVENTOR
James Leavy
BY
Nicholas M. Goodlett Jr.
his ATTORNEY

THE NORRIS PETERS CO., WASHINGTON, D. C.

UNITED STATES PATENT OFFICE.

JAMES LEAVY, OF NEW YORK, N. Y., ASSIGNOR TO CROUCH & FITZGERALD, A CORPORATION OF NEW YORK.

GARMENT-RECEPTACLE.

No. 920,352.  Specification of Letters Patent.  Patented May 4, 1909.

Application filed March 19, 1909. Serial No. 484,435.

*To all whom it may concern:*

Be it known that I, JAMES LEAVY, a citizen of the United States, and a resident of the borough of Manhattan, city, county, and State of New York, have invented certain new and useful Improvements in Garment-Receptacles, of which the following is a specification.

This invention relates to garment receptacles such as wardrobes, wardrobe trunks and the like.

The invention seeks to provide a simple, durable and economical arrangement of swinging hanger rack and whereby the rack may work to and fro without engagement with the walls of the receptacle.

Figure 1:
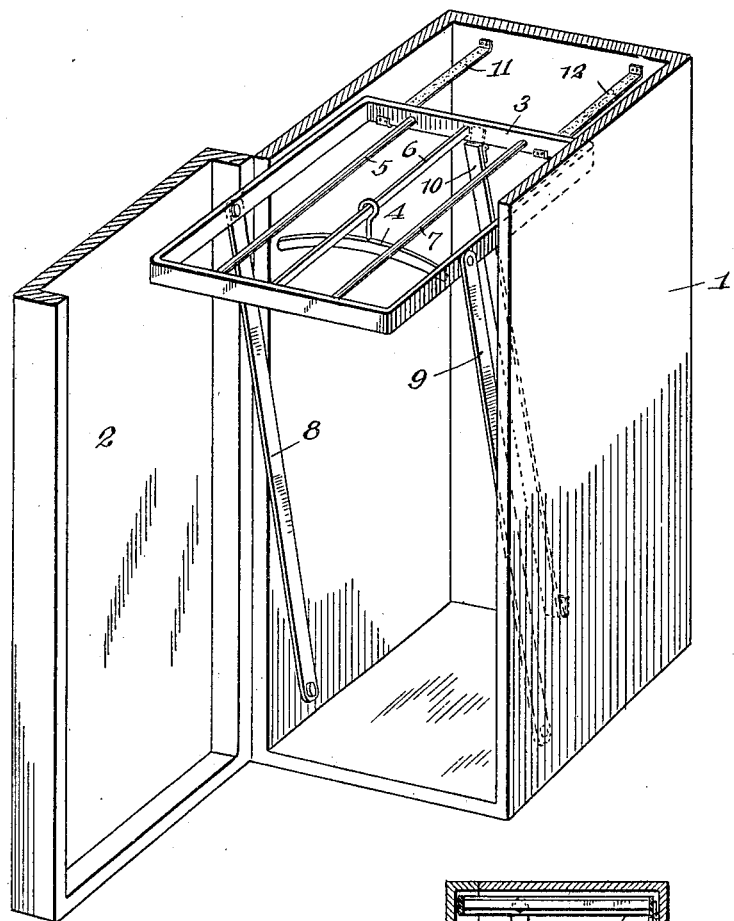
Figure 2:
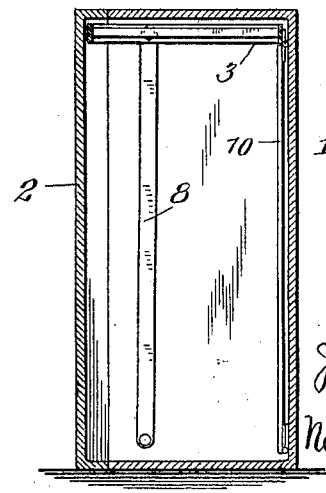

In the drawings which show the preferred embodiment of the invention and in which like reference numerals designate corresponding parts in the several views,—Figure 1 is a perspective elevation with the top removed and showing the rack in forward position. Fig. 2 is a sectional elevation showing the receptacle closed and the rack in its rear position.

Referring to the specific construction shown in the drawings, 1 is the receptacle or trunk open at the front and provided with a hinged closure 2.

3 is an elevated rack arranged to move to and fro near the top of the receptacle and arranged to carry hangers, such as 4. The rack is preferably rectangular in form and is provided with cross rods 5, 6 and 7 for supporting the hangers and acting also to brace and strengthen the rectangular hanger rack.

8 and 9 are legs pivoted at their lower ends to the interior of the receptacle near the bottom and at their upper ends to the sides of the rack.

10 is a rear leg pivoted at its upper end to the rear of the rack 3 and at its lower end to the interior of the receptacle or chamber, hinges, as shown, being preferably provided for making this pivotal connection at both ends of the leg 10.

11 and 12 are two strips of webbing secured at their forward ends to the rear of the rack and at their rear ends to the rear wall of the receptacle and acting to limit the outward movement of the rack.

When the rack is weighted with garments, the greatest strain of the load is exerted at the middle point of the rear crossbar of the rack. It will be found in practice that this strain is not infrequently sufficient to cause the rack to break at this point. By employing the leg 10 to support the rack at the point referred to, this tendency is entirely counteracted.

The rack is at all times supported entirely by its three legs and out of engagement with the walls of the receptacle. By this arrangement, the free and easy movement of the rack is not interfered with by any distortion of the receptacle due to rough handling, such as that to which trunks are frequently subjected. Furthermore, by supporting the rack free from supporting engagement with the walls of the receptacle, the rack encounters no sliding friction in its movement such as would retard the movement of the rack, especially when weighted with suspended garments. By the arrangement herein shown and described, the rack is supported and guided in its movement by its three tilting legs, the rear leg acting to maintain the rack in substantially horizontal position, all the legs being so disposed as to offer no obstacle to the free and easy access to the interior of the receptacle or the garments carried on the rack.

When the rack is moved back into its inner position, the lid or door 2 may be closed and it will then act to hold the rack in place.

What is claimed and what is desired to be secured by Letters Patent is:—

In a receptacle for clothing, a garment chamber open at the front; a hanger rack for said chamber having a limited swinging movement toward and from the rear of said receptacle; a pair of tilting legs pivoted at their lower ends within said chamber and at their upper ends to the opposite sides of said rack; and a tilting leg pivoted at its lower end within said chamber and at its upper end to the rear of said rack.

In testimony whereof, I have signed my name to this specification, in the presence of two subscribing witnesses.

JAMES LEAVY.

Witnesses:
 IDA G. GILMORE,
 NICHOLAS M. GOODLETT, Jr.